Patented June 21, 1932

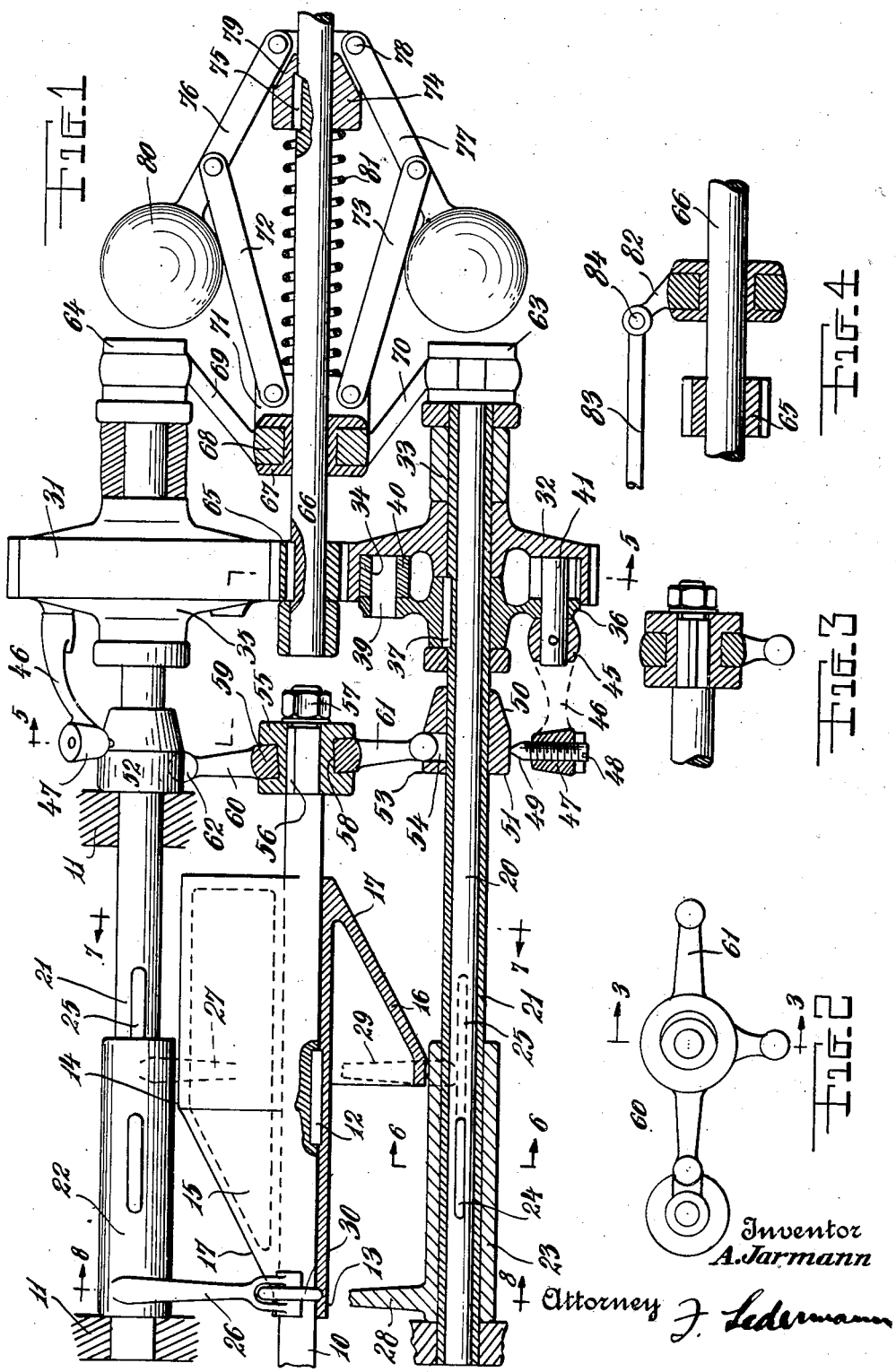

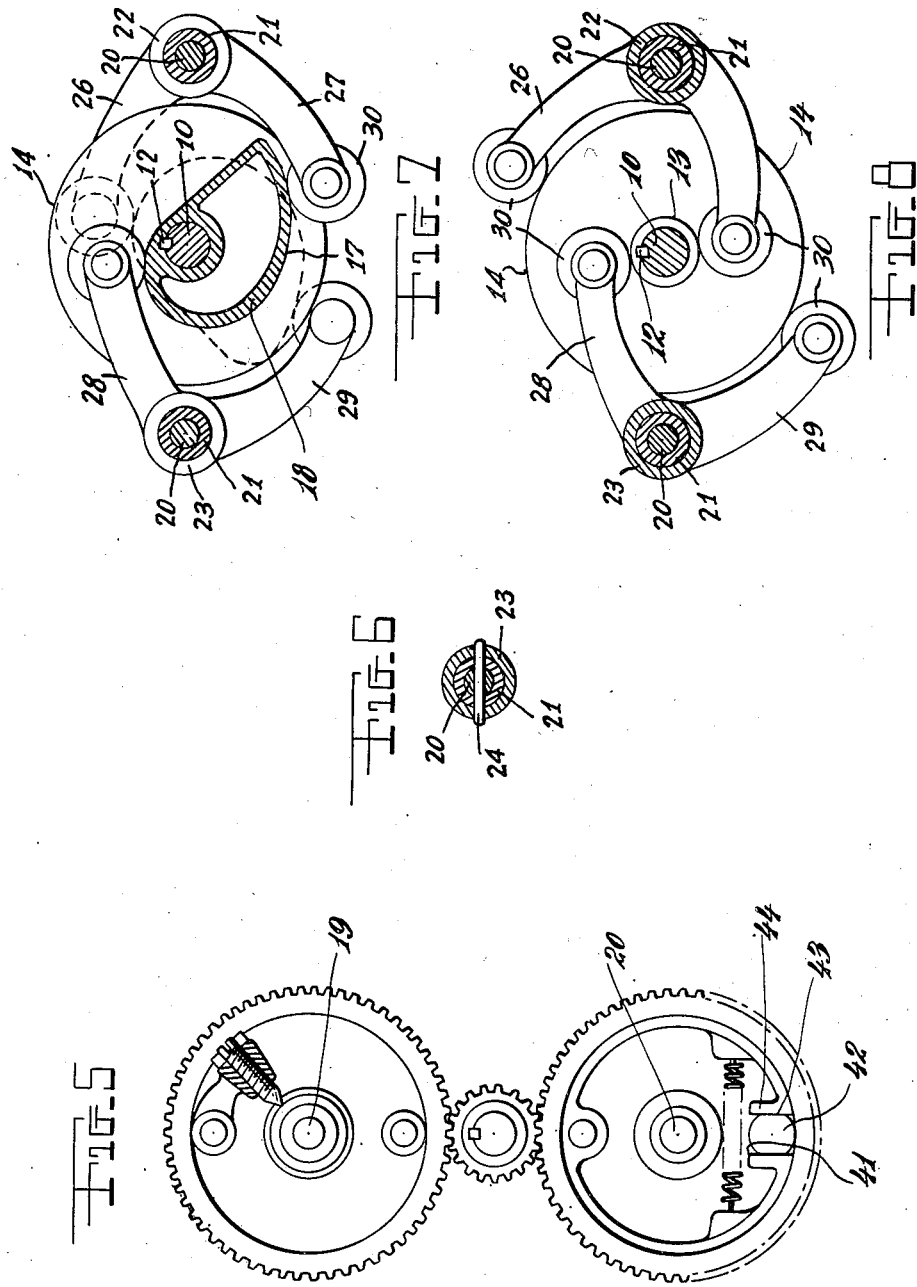

1,863,598

UNITED STATES PATENT OFFICE

ALFRED JARMANN, OF BALLSTON SPA, NEW YORK

VARIABLE TRANSMISSION

Application filed October 11, 1930. Serial No. 487,968.

The main object of this invention is to provide a vehicle with a variable speed transmission located between the motor shaft and the vehicle transmission shaft. This variable speed transmission is attained without the use of a gear shift lever and deviated from the train of gear principle so well known in transmission systems of the present day. The device consists of oscillating bell cranks which are adapted to be arcuately swung by riding upon tapering cones, this oscillation being transmitted to a pair of pinion shafts which are also caused to be rotated and engage drum gears meshing with a pinion on the vehicle transmission. These bell cranks are alternately swung an arcuate distance and thereby exert a constant rotational force upon a pinion located on a transmission shaft.

The above and other objects will become apparent from the description below in which characters of reference refer to like-named parts in the drawings.

Referring briefly to the drawings, Figure 1 is a sectional longitudinal elevational view of the variable speed transmission mechanism.

Figure 2 is a front elevational view of the alternator lever.

Figure 3 is a longitudinal sectional elevational view of Figure 2 taken on line 3—3 of Figure 2.

Figure 4 is a longitudinal sectional elevational view of the speed control sleeve.

Figure 5 is a partly sectioned elevational view through a clutch drum and transmission gears taken on line 5—5 of Figure 1.

Figure 6 is a cross sectional view through one of the oscillating shafts taken on line 6—6 of Figure 1.

Figure 7 is a cross sectional view through the oscillator cones showing the cooperation therewith of the oscillator cranks, the section being taken on line 7—7 of Figure 1.

Figure 8 is a view similar to Figure 7, the section being taken on line 8—8 of Figure 1.

Referring in detail to the drawings, the numeral 10 indicates the main drive shaft which extends from the power plant of the vehicle. This drive shaft is properly journalled in suitable bearings at all desirable positions as indicated by the numeral 11. Between a set of bearings cam cones are located on the drive shaft. Said cones taper longitudinally and are secured to the shaft by a key 12. The cone tapers down at one end to a circular sleeve 13 at which position the movement is zero. Midway the length of the cones a second and larger circular surface 14 is formed. Between the small end 13 and the circular surface 14 and the opposite end the cone is formed into tapering sections 15 and 16, both sections tapering in the same direction. The inclining surfaces of these sections are oppositely disposed to each other as indicated by the numeral 17. Said sections represent in cross section a variable cam as indicated by the numeral 18 and assume a longitudinal outline as illustrated in Figure 1.

Adjacent the drive shaft 10, a pair of oscillator shafts 19 and 20 are located. Both of these shafts are slidably fixed in substantially long sleeves 21. Slidable on these sleeves a predetermined distance oscillator barrels 22 and 23 are located. The shafts 19 and 20 are provided with rigidly mounted keys 24 which register and are slidable in channels 25 formed diametrically in the sleeves 21. This construction permits the shafts 19 and 20 in the sleeves 21 and the barrels 22 and 23 to be moved as one without affecting the position of the sleeves. The barrel 22 has a curved arm 26 extending angularly therefrom, while diametrically opposite a second arm 27 extends in an opposite direction. Said arms are spaced apart from each other a predetermined distance. The remaining barrel 23 is also provided with a pair of diametrically opposed diverging arms 28 and 29 spaced apart an identical distance. The free outer ends of all of these arms are spread or bifurcated so that rollers 30 may be journalled rotatably therebetween, said rollers being adapted to have their traction on the cam cones.

A pair of hollow gears 31 and 32 are rotatably mounted on the sleeves 21 adjacent bearings 33. Both of these gears are provided with annular pockets which have circular clutch surfaces 34. Clutch discs 35 and 36 are rigidly secured to the sleeves 21 adjacent the spur gears by keys 37. One of the faces of each of these discs has a stud 38 extending therefrom into the pocket of the complemental gear. A split spreader ring 40, circular in outline is suspended from the stud and fits snugly into each of the pockets of the spur gears 31 and 32. The split ends of the spreader ring are separated by a gap 41 in which one end of a spreader bolt 42 registers. The bolt is substantially circular in cross section and is provided with a pair of parallel flat surfaces 43, the distance between which is less than the diameter of the bolt. Normally these flat surfaces 43 lie in contact with the split ends of the ring 40, which latter has ears 44 formed thereon on both sides of the gap. The spreader bolts 41 are anchored rotatably in the clutch discs 35 and 36 and project from the opposite sides of the latter. The projecting ends of these bolts have mounted thereon the hubs 45 of alternator levers 46. The free ends of these levers are formed into collars 47 through which threaded adjusting screws 48 pass. These levers 46 jut outwardly away from the discs, and pointed ends 49 of the adjusting screws are adapted to ride upon a conical surface 50 which merges with an annular surface 51 of a pair of alternator bands 52 and 53 which latter are slidably mounted on the elements 21 of the device. In each of these bands 52 and 53 axial depressions 54 are formed for purposes which will be more fully hereinafter described. The drive shaft 10 is provided with a collar 55 which is secured to the shaft by a key 56 and is anchored upon the same by means of a nut 57 engaging threaded end of the drive shaft. This collar 55 is provided with a continuous annular helical channel 58. A circlet 59 registers in this helical channel and is adapted to be retained in stationary position by a pair of alternator rods 60 and 61. These alternator rods are provided with balled heads 62 which partly register in the depressions 54 of the bands 52 and 53.

The sleeves 21 are mounted on the shafts 19 and 20 of the transmission device, said shafts having flanged collars 63 and 64 secured to their ends. Between the spur gears 31 and 32 and meshing with the latter is a pinion 65 which is keyed upon a driven shaft 66. This shaft extends to the differential of the device. A flanged sleeve 67 is slidably mounted upon driven shaft and has a circular channel therein which is receptive of a ring 68. Said ring is provided with a pair of downwardly extending arms 69 and 70. Projecting from the side of the sleeve 67 are a pair of ears 71 to which are pivoted link members 72 and 73. Spaced apart from the movable sleeve member 67 is a rigidly mounted hub 74 which is secured to the driven shaft 66 by a key 75. This hub has a pair of diametrally opposed rods 76 and 77 pivotally anchored on pins 78 in slot 79. The ends of these rods 76 and 77 have weighted balls 80 mounted thereon. A coiled spring 81 is wound about the driven shaft 66, and is adapted to rest upon the rigid hub 74 at one end while the opposite end of said spring urges the flanged sleeve toward the mechanism. The ring 68 has an angular stud 82 thereon to which a rod 83 is pivotally connected by a pin 84. This rod extends to a foot pedal, and is adapted to control the latter according to the position the governor illustrated in Figure 1 finds itself in.

The device illustrated in the several views of the drawings is adapted to serve as a transmission which may be variably adjusted to any position without the aid of levers or the like. The drive or motor shaft 10 is provided with a cone such as indicated by the numeral 15, and has inclined cam surfaces 17 thereon upon which rides the rollers 30 of the curved arms 26 and 27.

Figures 7 and 8 of the drawings show these curved arms in their relation to one another. It will be noted that each of the oscillator barrels 22 and 23 is provided with a pair of oppositely curved arms 26 and 27 on one barrel and 28 and 29 on the opposing barrel. These arms are adapted to have their rollers 30 ride upon the cone 15. Owing to the inclined surfaces 17 on the cone member 15 an arcuate movement of the arms takes place; these arms being integral with the barrels 22 and 23 swing the latter through an arc; the barrels being slidably keyed upon the long sleeves 21 swing these sleeves also. The arcuate swinging of these sleeves is transmitted to the clutch discs 35 and 36 alternately. These clutch discs are slitted so that they may be spread to cause the peripheral surfaces of the disc members to engage the rim of the spur gears 31 and 32. Spreading of these clutch discs is accomplished by the oscillator arms 60 whose collar 59 is engaged in a helical channel 58 formed in the collar 55. As this collar is rotated, the helical channel therein causes the circlet 59 to shift its position, thereby oscillating the arms 60 and 61 whose outer ends being in openings 54 of members 51 and 52 cause these members 51 and 52 to ride longitudinally upon the sleeves 21. The conical face 50 of the bands 52 and 53 present themselves to the tips of said screws 48 which are adjustably incorporated in the spreader levers 46 and these spreader levers engage and arcuately rotate the bolt heads 42 and the flat faces thereof spread the clutch discs apart so that the peripheries of the latter engage the internal surface 34 of the spur gears and lock these spur gears to the clutch discs for the entire duration of the arcuate swing of the sleeves 21. These sleeves 21 are alternately actuated, and consequently the spur gears are alternately rotated so that while one spur gear is rigidly locked to its corresponding sleeve 21 rotating the pinion 65, the remaining spur gear rides loosely upon the sleeve and is carried therewith but is not actuated by the mechanism. In this manner, a constant rotation of the pinion gear 65 is had through the alternate engagement of the spur gears 31 and 32 with the oscillating sleeves 21 through the medium of the spreader arms 46 with the resultant continuous rotation of the transmission shaft 66 of the vehicle.

It is to be noted that certain changes in form and construction may be made without departing from the spirit and scope of the invention.

I claim:

1. In a device of the class described, a driving shaft, a driven shaft having a pinion thereon, a cone on said driving shaft, oscillator shafts arranged on opposite sides of said driving shaft, sleeves on said oscillator shafts, means slidable on said sleeves cooperating with said cone for arcuately swinging said sleeves and oscillator shafts, spur gears loosely mounted on said sleeves and meshing with said pinion, means on said driving shaft for locking said spur gears rigidly to said sleeves.

2. In a device of the class described, a driving shaft, a driven shaft having a pinion thereon, a cone on said driving shaft, oscillator shafts arranged on opposite sides of said driving shaft, sleeves on said oscillator shafts, means slidable on said sleeves cooperating with said cone for arcuately swinging said sleeves and oscillator shafts, spur gears loosely mounted on said sleeves and meshing with said pinion, means on said driving shaft for alternately locking said spur gears rigidly to said sleeves.

3. In a device of the class described, a driving shaft having a cone thereon, a driven shaft having a pinion mounted thereon, sleeves a pair of oscillator shafts slidable axially therein, barrels axially movable on said sleeves, a pair of arms on each barrel, rollers on said arms riding upon said cone, said cone when rotated being adapted to oscillate said arms and swing said barrels through an arc, spur gears loosely mounted on said sleeves, means secured to said sleeves for locking said spur gears to said sleeves, said spur gears meshing with said pinion, and means for actuating said first-named means.

4. In a device of the class described, a driving shaft having a cone thereon, a driven shaft having a pinion mounted thereon, sleeves a pair of oscillator shafts slidable axially therein, barrels axially movable on said sleeves, a pair of arms on each barrel, rollers on said arms riding upon said cone, said cone when rotated being adapted to oscillate said arms and swing said barrels through an arc, spur gears loosely mounted on said sleeves, said spur gears meshing with said pinion, and means for actuating said spur gears, a spreader clutch on each sleeve engaging its corresponding spur gear.

5. In a device of the class described, a driving shaft having a cone thereon, a driven shaft having a pinion mounted thereon, sleeves a pair of oscillator shafts slidable axially therein, barrels axially movable on said sleeves, a pair or arms on each barrel, rollers on said arms riding upon said cone, said cone when rotated being adapted to oscillate said arms and swing said barrels through an arc, spur gears loosely mounted on said sleeves, said spur gears meshing with said pinion, clutch discs in said spur gears and means slidably mounted on said sleeve for spreading said clutch discs to cause engagement of said clutch discs with said spur gears to lock the latter upon said sleeves.

6. In a device of the class described, a driving shaft having a cone thereon, a driven shaft having a pinion mounted thereon, sleeves a pair of oscillator shafts slidable exially therein, barrels axially movable on said sleeves, a pair of arms on each barrel, rollers on said arms riding upon said cone, said cone when rotated being adapted to oscillate said arms and swing said barrels through an arc, spur gears loosely mounted on said sleeves, said spur gears meshing with said pinion, clutch discs in said spur gears and mounted on said sleeves, and means slidably mounted on said sleeve for spreading said clutch discs to cause engagement of said clutch discs with said spur gears to lock the latter upon said sleeves, and means mounted on said driving shaft for moving said first-named means in opposing directions to cause alternate engagement of the clutch discs with the spur gears.

7. In a device of the class described, a driving shaft having a cone thereon, a driven shaft having a pinion mounted thereon, sleeves a pair of oscillator shafts slidable axially therein, barrels axially movable on said sleeves, a pair of arms on each barrel, rollers on said arms riding upon said cone, said cone when rotated being adapted to oscillate said arms and swing said barrels through an arc, spur gears loosely mounted on said sleeves, said spur gears meshing with said pinion, clutch discs in said spur gears and mounted on said sleeves, bands slidable on said sleeves having conical ends thereon, means riding on said conical ends of said bands for spreading said clutch discs to engaging position with said spur gears.

8. In a device of the class described, a driving shaft having a cone thereon, a driven shaft having a pinion mounted thereon, sleeves a pair of oscillator shafts slidable axially therein, barrels axially movable on said sleeves, a pair of arms on each barrel, rollers on said arms riding upon said cone, said cone when rotated being adapted to oscillate said arms and swing said barrels through an arc, spur gears loosely mounted on said sleeves, said spur gears meshing with said pinion, clutch discs in said spur gears and mounted on said sleeves, bands slidable on said sleeves having conical ends thereon, a spreader bolt mounted on said clutch discs, a split spreader ring mounted in said spur gears, said spreader bolt engaging said spreader ring, alternating levers secured to said spreader bolts and engaging the conical ends of said bands, said bands when shifted being adapted to rotate said alternating levers to swing said spreader bolts and spread the rings apart to cause engagement of the rings with said spur gears.

9. In a device of the class described, a driving shaft having a cone thereon, a driven shaft having a pinion mounted thereon, sleeves a pair of oscillator shafts slidable axially therein, barrels axially movable on said sleeves, a pair of arms on each barrel, rollers on said arms riding upon said cone, said cone when rotated being adapted to oscillate said arms and swing said barrels through an arc, spur gears loosely mounted on said sleeves, said spur gears meshing with said pinion, clutch discs in said spur gears and mounted on said sleeves, bands slidable on said sleeves having conical ends thereon, a spreader bolt mounted on said clutch discs, a split spreader ring mounted in said spur gears, said spreader bolt engaging said spreader ring, alternating levers secured to said spreader bolts and engaging the conical ends of said bands, said bands when shifted being adapted to rotate said alternating levers to swing said spreader bolts and spread the rings apart to cause engagement of the rings with said spur gears, a collar mounted on said driving shaft, having a helical channel thereon, and means riding in said helical channel engaging said bands for alternately shifting the latter in opposite directions to cause alternate engagement of the spur gears with the pinion.

10. In a device of the class described, a driving shaft having a cone thereon, a driven shaft having a pinion mounted thereon, sleeves a pair of oscillator shafts slidable axially therein, barrels splined on said sleeves, a pair of arms on each barrel, rollers on said arms riding upon said cone, said cone when rotated being adapted to oscillate said arms and swing said barrels through an arc, spur gears loosely mounted on said sleeves, said spur gears meshing with said pinion, clutch discs in said spur gears and mounted on said sleeves, bands slidable on said sleeves having conical ends thereon, a spreader bolt mounted on said clutch discs, a split spreader ring mounted in said spur gears, said spreader bolt engaging said spreader ring, alternating levers secured to said spreader bolts and engaging the conical ends of said bands, said bands when shifted being adapted to rotate said alternating levers to swing said spreader bolts and spread the rings apart to cause engagement of the rings with said spur gears, a collar mounted on said driving shaft, having a helical channel thereon, a circlet riding in said helical channel, diametrically opposing arms, extending from said circlet and engaging said bands, said arms being adapted to be oscillated by rotation of said driving shaft and alternately moving said bands in opposite direction to cause alternate engagement of the spur gears with the sleeves for continuously rotating said pinion on said driven shaft.

11. In a device of the class described, a driving shaft having a cone thereon, a driven shaft, a pinion mounted thereon, sleeves, a pair of oscillator shafts slidable axially therein, barrels splined on said sleeves, a pair of arms on each barrel, rollers on said arms riding upon said cone and adapted to oscillate, spur gears loosely mounted on said sleeves, said spur gears meshing with said pinion on said driven shaft, bands slidable on said sleeves having conical ends thereon, clutch discs in said spur gears and mounted on said sleeves, a spreader bolt mounted on each of said clutch discs, a split spreader ring mounted in each of said spur gears, said spreader bolt engaging said spreader ring, alternating levers secured to said spreader bolts and engaging the conical surfaces of said bands, said bands when shifted being adapted to rotate said alternating levers to swing said spreader bolts and spread the rings apart to cause engagement of the rings with said spur gears, a collar mounted on said driving shaft having a helical channel therein, and means riding in said helical channel engaging said bands for alternately shifting the latter in opposing directions to cause alternate engagement of the spur gears with the pinion, and means for shifting said sleeves on said oscillator shafts and barrels to vary the throw of said barrel arms.

12. In a device of the class described, a driving shaft having a cone thereon, a driven shaft, a pinion mounted thereon, sleeves, a pair of oscillator shafts slidable axially therein, barrels splined on said sleeves, a pair of arms on each barrel, rollers on said arms riding upon said cone and adapted to oscillate, spur gears loosely mounted on said sleeves, said spur gears meshing with said pinion on said driven shaft, bands slidable on said sleeves having conical ends thereon, clutch discs in said spur gears and mounted on said sleeves, a spreader bolt mounted on each of said clutch discs. a split spreader ring mounted in each of said spur gears, said spreader bolt engaging said spreader ring, alternating levers secured to said spreader bolts and engaging the conical surfaces of said bands, said bands when shifted being adapted to rotate said alternating levers to swing said spreader bolts and spread the rings apart to cause engagement of the rings with said spur gears, a collar mounted on said driving shaft having a helical channel therein, arms connected to said oscillator shafts, a member slidable on said driven shaft, a second member rigid on said driven shaft, and centrifugal means swinging from said second-named member for shifting said first-named member along said driven shaft to simultaneously shift said oscillator shafts longitudinally and move said barrels along said actuator cone.

In testimony whereof I affix my signature.

ALFRED JARMANN.